March 2, 1943. S. PIRO, JR 2,312,585

ARTIFICIAL BAIT CASTING LURE

Filed March 7, 1942

Inventor
Salvatore Piro, Jr.
By A. F. Flournoy
Attorney

Patented Mar. 2, 1943

2,312,585

UNITED STATES PATENT OFFICE 2,312,585

ARTIFICIAL BAIT CASTING LURE

Salvatore Piro, Jr., Mangham, La.

Application March 7, 1942, Serial No. 433,699

9 Claims. (Cl. 43—46)

My invention relates to artificial fishing lures and more particularly to a style of fishing lure that simulates movements of a live bug or crippled minnow.

This application is a continuation in part application of the patent application filed by the same applicant, Salvatore Piro, Jr., for Artificial bait casting lure, Serial Number 371,183, filed December 21, 1940.

An object of my invention is to provide a fishing lure that may be given a fluttering motion in the water by slight jerks on a casting line attached to it. In the creation of my artificial fishing lure, I have introduced a radically new principle in the mode of operation of artificial fishing lures when I incorporated in my lure hinged members both of which are under the control of my casting line. Broadly speaking, my lure is comprised of a body member with the usual hooks fastened to it, and a movable member that is hinged to the main body member and which may or may not have hooks fastened to it. The casting line to which this lure is attached is threaded through an eyelet on an end of the body member and is positively fastened to the movable member by means of another eyelet or other fastening means such as a tack, screw, or staple so that any pull on the casting line will easily cause the movable member to close down onto the main body member. By this arrangement, a slight jerk on the casting line that pulls the lure as a whole forward only a slight distance gives a considerable fluttering motion to my lure. This fluttering motion simulates the motions of a live bug or crippled minnow. Because of the closing action of the hinged members, I can maintain an action of my bait at a favorable spot longer than it would be possible to maintain an action at the same spot with a prior art type of lure that gets its action only because of its steady advance through the water.

To further explain my invention, attention is directed to a detailed description to follow of styles of lures embodying my invention illustrated by the accompanying drawing forming a part of my disclosure.

Figure 2:
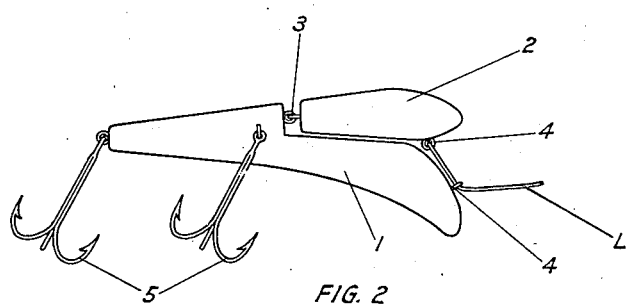
Figure 2 is a side elevation view of the lure illustrated in Figure 1 showing the hinged members in closed position when the casting line is tightened.
Figure 1:
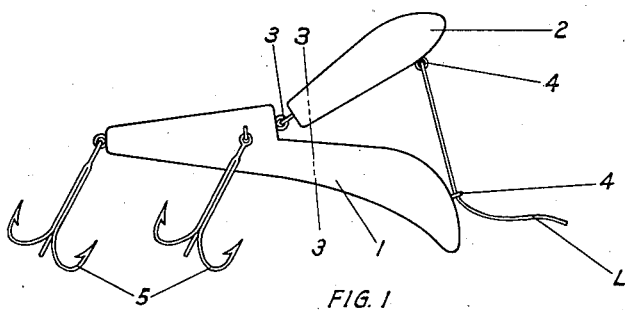
Figure 1 is a side elevation view of a lure embodying my invention showing the hinged members in open position when the casting line is slackened.
Figure 3:
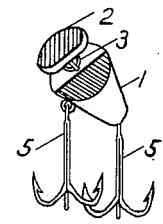
Figure 3 is a transverse section on the line 3—3 of Fig. 1.

Referring to Figures 1, 2 and 3, numeral 1 designates generally the main body member of my fishing lure; numeral 2 designates the movable member which is hinged at one of its ends to the main body member 1 at a medial portion of its length by means of interlocking eye screws constituting a universal hinge 3 by which arrangement the movable members are universally hinged together. I provide an eyelet screw 4 at the forward end of the main body member 1 to serve as a guide for the casting line L to run through. I thread the casting line L through the eye of an eyelet screw 4 and fasten the end of the line L onto another eyelet screw 4 which is located at a medial portion of the length of the movable member 2. The hook members 5 that I mount on the main body member 1 of my lure, one at the rear end and one on one side only about the middle, shown by Figure 3 of my drawing are of sufficient weight to turn the main body member 1 on its side and to slightly submerge the main body member 1 under the water to allow the water to buoy the movable member 2 to the open position as shown in Figure 1 which is the position my lure assumes when it is cast and the casting line L is slackened.

Best results are obtained with my novel lure when it is retrieved slowly after each cast by a series of individual jerks. The individual jerks should be made fast to bring out the proper action of my lure, but as soon as an action is completed the caster should pause a moment before making the next jerk. The caster may also get good results by slowing down the retrieving action between the jerks until the lure is barely moving. The intermittent retrieving and jerking action may be employed, or the slow retrieve and jerking action may be employed if desired, or a combination of the two, all dependent upon the character of the fish sought, the condition of the water, and weather conditions.

Figure 4:
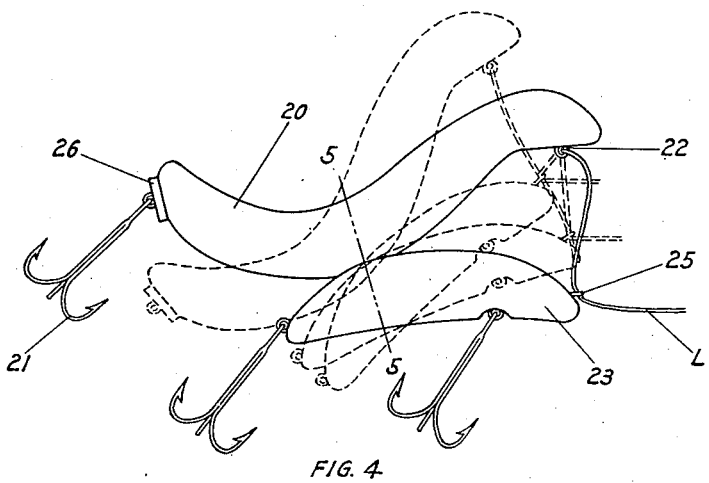
Figure 4 is a side elevation view of a modified form of my invention showing the hinged members hinged together at a medial portion of their lengths and both being provided with hooks and, Figure 5 is a cross sectional view taken on a line 5—5 of the lure illustrated in Figure 4.
Figure 5:
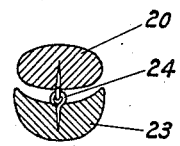

In the modification of my lure illustrated by Figures 4 and 5, numeral 20 designates the main movable body member which is provided with a hook member 21, fastened at its rear end. The main body member 20 is provided with an eyelet 22 to which the casting line L is fastened. The movable body member 23 is universally hinged to the main movable body member by means of the universal hinge 24. The casting line L is threaded through the eye of the eyelet screw 25. The movable body member 23 in this modification of my lure is hinged at a medial portion of its length on a medial portion of the length of the main movable body member 20. At the rear end of the main movable body member 20, I provide a weight 26 and another hook member 21. In this modification of my lure, the weight 26 causes the rear end of the main movable body member 20 to sink and its forward end to rise. The pull of gravity on the weight 26 brings about a quicker opening action of my modified lure illustrated in Figure 3 than is possible with the lure construction illustrated by Figures 1 and 2. My modified lure is designed to be cast and retrieved in the same manner as the above described lure illustrated by Figures 1 and 2.

In the construction of my lure I have found wood to be a suitable material out of which to make the body members and the movable members; however, various other materials may be used if desired. The hooks and eyelets used are standard hooks and eyelets, made preferably of non-rusting materials such as are in common use in the fish lure art. Any style of casting line L may be used.

Having thus described my invention, I claim:

1. An artificial bait comprising a weighted main body member in combination with a buoyant movable body member, said movable body member being hinged to the main body member at a medial portion of the length of the main body member, said main body member being provided with a hook and a line fastening means.

2. An artificial bait comprising a weighted main body member in combination with a buoyant movable body member, said movable body member being hinged to the main body member at a medial portion of the length of the main body member, said movable body member being provided with a hook and a line fastening means.

3. An artificial bait comprising a weighted main body member in combination with a buoyant movable body member, said movable body member being hinged to the main body member at a medial portion of the length of the movable body member, said movable body member being provided with a hook and a line fastening means.

4. An artificial bait comprising a weighted main body member and a buoyant movable body member, said movable body member being hinged to the main body member at a medial portion of the length of the movable body member, said movable body member being provided with a hook, said main body member being provided with a line fastening means.

5. The device as claimed in claim 3 wherein the main body member is provided with a line fastening means.

6. The device as claimed in claim 3 wherein the main body member is provided with a hook and a line fastening means.

7. An artificial bait comprising a main body member and a movable body member, said movable body member being hinged to the main body member, said movable body member being provided with a line fastening means, said main body member being provided with a hook and an eyelet fastening means through which a line may run to the said line fastening means on the said movable body member whereby a pull on a line fastened to the fastening means on the movable body member will move the movable body member toward the said main body member.

8. An artificial bait comprising a main body member and a movable body member, said movable body member being hinged to the main body member, said movable body member being provided with a hook and a line fastening means, said main body member being provided with an eyelet through which a line may run to the line fastening means on the movable body member whereby a pull on a line fastened to the fastening means and threaded through the eyelet will cause the movable body member to move toward the main body member.

9. An artificial bait comprising a main body member provided with a line fastening means and a movable body member joined to the main body member, said movable body member being provided with a line fastening means, one of said fastening means being provided with an eye through which a line may run to the other fastening means whereby a pull on the line will cause a movement of the movable body member with respect to the main body member.

SALVATORE PIRO, JR.